July 9, 1929.     A. ALLAN ET AL     1,720,586
OIL IMMERSED ELECTRIC SWITCH GEAR
Filed Feb. 25, 1928
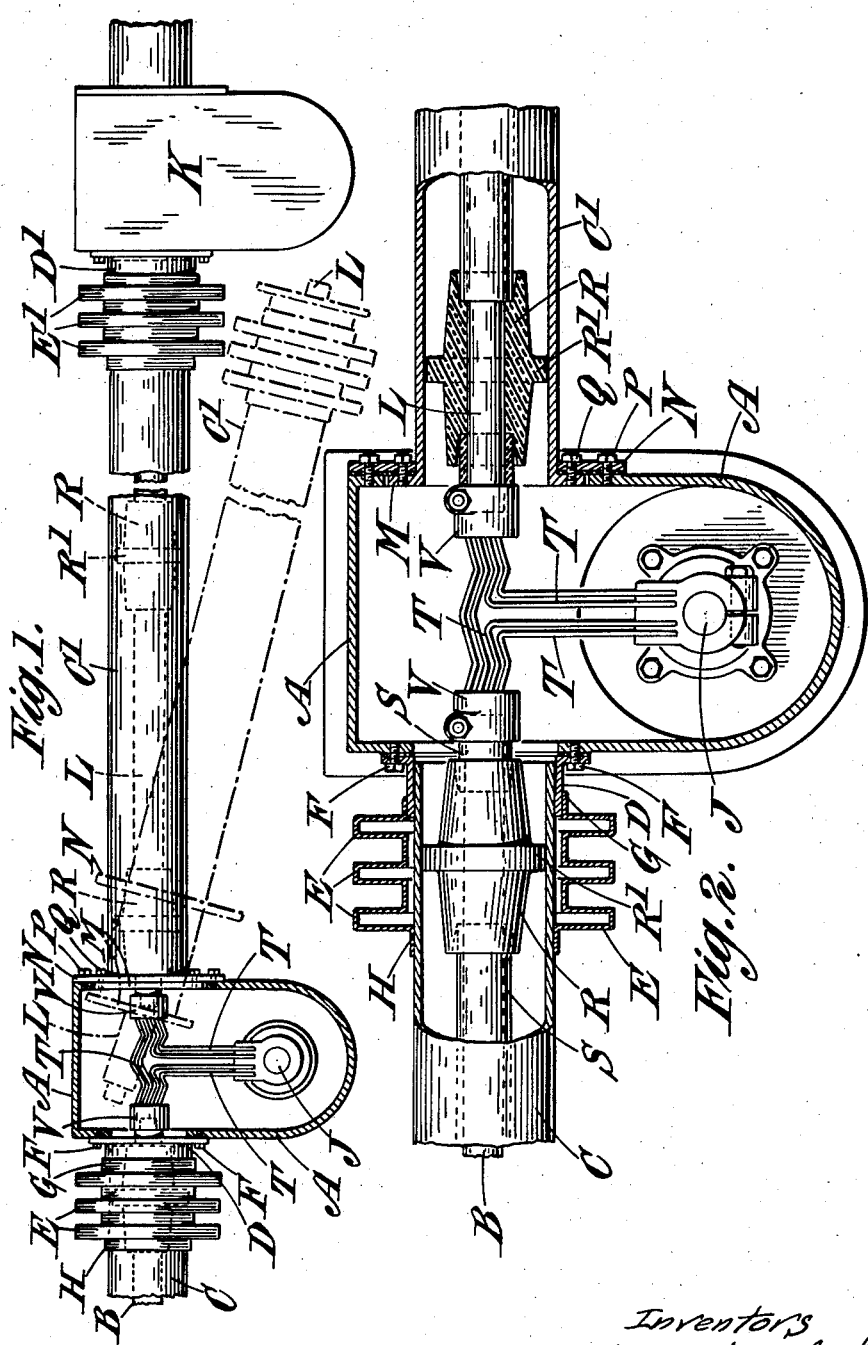

Patented July 9, 1929.

1,720,586

UNITED STATES PATENT OFFICE.

ARCHIBALD ALLAN, OF TYNEMOUTH, AND HENRY WILLIAM CLOTHIER, OF WALLS-END-ON-TYNE, ENGLAND, ASSIGNORS TO A. REYROLLE & COMPANY LIMITED, OF HEBBURN-ON-TYNE, ENGLAND, A COMPANY OF GREAT BRITAIN.

OIL-IMMERSED ELECTRIC SWITCH GEAR.

Application filed February 25, 1928, Serial No. 256,982, and in Great Britain March 23, 1927.

This invention relates to oil-immersed electric switchgear, i. e. to switchgear of the kind in which the chambers for the switches, sockets and other parts are filled with oil.

It is desirable that the connections to such gear, for instance the busbar connections and the connections between the parts in the various chambers, shall be oil-immersed, and difficulties may arise from the expansion of the oil and of the connections.

The object of the present invention is primarily to obviate such difficulties.

In oil-immersed electric switchgear according to this invention the mechanical joint or connection between the tube through which the busbar or other conductor passes and the chamber is made by means of a socket in sliding engagement with the tube, an oil-tight connection being made between the socket and the tube by means of a flexible sleeve.

The socket is flanged for attachment by bolts or the like to the wall of the oil-filled chamber. The end of the tube slides within the socket and the flexible sleeve, which may for instance be made of light corrugated metal, has one end fastened round the socket and the other secured round the tube at some short distance away from the socket.

When a switch, socket or other part of the gear contained in one oil-filled chamber has to be connected to another part in another oil-filled chamber, this is effected by a conductor passing through an oil-filled tube having at one end a socket and flexible sleeve as above described, whilst the other end of the tube is flanged and provided with an annular washer or ring of smaller internal diameter than the flange. This washer is slipped over the tube before the other end of that member is attached to the flexible sleeve and it is secured round the outside of the opening in the second chamber and is also secured to the flange at the end of the tube. It thus makes an oil-tight connection between the chamber and the tube.

Such an arrangement is convenient in assembling the gear as the end of the tube which has the annular washer can be passed inside the opening in its chamber to allow the sliding and flexible joint at the other end to be made, the joint at the first end being made afterwards.

The busbar or other conductor is supported at intervals within the tube by tubular insulators having central collars or flanges which centre them in the tube and the conductor between the insulators is taped or covered by a tube of insulating material. When such tubes are used their ends may rest in recesses formed in the supporting insulators.

The electrical connections between the conductor and the socket or other parts within the oil-filled chambers may be made by flexible strips held in a socket or clamp attached to the conductor. This allows for any movement of the conductor due to its linear expansion and prevents stress on the connected parts.

In the accompanying drawings which illustrate one arrangement of oil-immersed switchgear according to this invention, Figure 1 is a plan view partly in section, and Figure 2 is a similar view of a portion of Figure 1 on an enlarged scale.

In these figures A is an oil-filled chamber and B is a conductor enclosed in an oil-filled tube C which is connected to the chamber A by a socket D which is in sliding engagement with the tube C an oil-tight connection being made between the socket and the tube by means of a flexible sleeve E.

The socket D is flanged for attachment by bolts F to the wall of the oil-filled chamber A. The end of the tube C slides within the socket D when the tube or the oil in it expands or contracts and the flexible sleeve E which is made of light corrugated metal has one end fastened round the socket at G and the other secured round the tube at H.

When a member J forming for instance part of a switch circuit contained in the oil-filled chamber A has to be connected to a like part in another oil-filled chamber K (Figure 1) this is effected by a conductor L passing through an oil-filled tube $C^1$ having at one end a socket $D^1$ and flexible sleeve $E^1$ similar to the parts C, D and E above described, whilst the other end of the tube $C^1$ has a flange M and is provided with an annular washer N of smaller internal diameter than the flange M. The annular washer N is secured round the outside of the opening in the chamber A by bolts P and is also secured to the flange M by bolts Q. The washer N thus makes an oil-tight connection between the chamber and the tube.

Such an arrangement is convenient in assembling the gear as the end of the tube $C^1$ which has the annular washer N can be passed inside the opening in the chamber A (as shown dotted in Figure 1) to allow the sliding and flexible joint to be made between the tube $C^1$ and the socket $D^1$ the washer N being bolted into place afterwards.

The conductors B and L are supported at intervals within the tubes C and $C^1$ by tubular insulators R having central collars $R^1$ which centre them in the tubes and the conductors between the insulators R are covered by tubes of insulating material S the ends of which rest in recesses in the supporting insulators R.

The electrical connections between the conductors B and L and the connections to the switch circuit contained in the oil-filled chambers A and K are made (as shown in Figure 2) by flexible strips T held in clamps V attached to the conductors. This allows for any movement of the conductors due to their linear expansion and prevents stress on the connected parts.

What we claim as our invention and desire to secure by Letters Patent is:—

In oil-immersed electric switchgear the combination with two oil-filled chambers, of a metal tube adapted to contain a conductor insulated from it and to form an oil-filled conduit between said chambers, a socket in sliding connection over one end of said tube, a sleeve attached to said socket and said tube and having flexibility in the direction of the longitudinal axis of the tube, a flange at the other end of said tube adapted to be passed into an opening in one of said chambers, and a washer adapted to be secured to said flange and round said opening to make an oil-tight connection between the flanged end of the tube and the adjacent chamber.

In testimony whereof we have signed our names to this specification.

ARCHIBALD ALLAN.
HENRY WILLIAM CLOTHIER.